(12) United States Patent
Yamaji et al.

(10) Patent No.: US 11,665,402 B2
(45) Date of Patent: May 30, 2023

(54) RECOMMENDATION DEVICE

(71) Applicant: NTT DOCOMO, INC., Chiyoda-ku (JP)

(72) Inventors: Daiki Yamaji, Chiyoda-ku (JP); Norihiro Katsumaru, Chiyoda-ku (JP); Shunsuke Fukuda, Chiyoda-ku (JP); Naoharu Yamada, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 51 days.

(21) Appl. No.: 17/615,682

(22) PCT Filed: Jun. 3, 2020

(86) PCT No.: PCT/JP2020/021901
§ 371 (c)(1),
(2) Date: Dec. 1, 2021

(87) PCT Pub. No.: WO2020/246496
PCT Pub. Date: Dec. 10, 2020

(65) Prior Publication Data
US 2022/0248094 A1    Aug. 4, 2022

(30) Foreign Application Priority Data
Jun. 5, 2019   (JP) .............................. JP2019-105334

(51) Int. Cl.
*H04N 21/466* (2011.01)
*H04N 21/45* (2011.01)

(52) U.S. Cl.
CPC ..... *H04N 21/4668* (2013.01); *H04N 21/4532* (2013.01)

(58) Field of Classification Search
CPC ....................... H04N 21/4668; H04N 21/4532
See application file for complete search history.

(56) References Cited

U.S. PATENT DOCUMENTS

2005/0246432 A1* 11/2005 Iijima .............. H04N 21/26241
348/E7.076

FOREIGN PATENT DOCUMENTS

JP    2010-262369 A    11/2010

OTHER PUBLICATIONS

International Search Report dated Aug. 18, 2020 in PCT/JP2020/021901 filed on Jun. 3, 2020 (2 pages).

(Continued)

*Primary Examiner* — Nnenna N Ekpo
(74) *Attorney, Agent, or Firm* — Oblon, McClelland, Maier & Neustadt, L.L.P.

(57) ABSTRACT

An information distribution server includes a status estimation unit that derives an expected value of the number of distributions of content in each status in each time period, a score derivation unit that derives a probability score of the content for each time period and for each status, a distribution target determination unit that extracts a combination of a time period, status, and content in which the probability score is equal to or higher than a predetermined threshold value, and determines content relevant to the combination as a distribution target, and a distribution unit that distributes the distribution target on the basis of information indicated by the combination extracted by the distribution target determination unit.

4 Claims, 6 Drawing Sheets

(56) References Cited

OTHER PUBLICATIONS

International Preliminary Report on Patentability dated Dec. 16, 2021 in PCT/JP2020/021901 (submitting English translation only), 5 pages.

* cited by examiner

| REQUEST ID | GENRE | THRESHOLD VALUE |
|---|---|---|
| 1 | DRAMA | 80% |
| ... | ... | ... |

(b)

| USER ID | STATUS | TIME PERIOD | GENRE | PROBA-BILITY SCORE |
|---|---|---|---|---|
| 1 | COMPANY | 9:00 | DRAMA | 70% |
| 1 | OUTSIDE | 12:00 | DRAMA | 80% |
| 1 | HOME | 18:00 | DRAMA | 60% |
| ... | ... | ... | ... | ... |

(c)

| USER ID | STATUS | TIME PERIOD | EXPECTED VALUE |
|---|---|---|---|
| 1 | COMPANY | 9:00 | 0.1 |
| 1 | OUTSIDE | 12:00 | 0.3 |
| 1 | HOME | 18:00 | 0.4 |
| ... | ... | ... | ... |

RECOMMENDATION DEVICE

TECHNICAL FIELD

One aspect of the present invention relates to a recommendation device that recommends content to a user.

BACKGROUND ART

Patent Literature 1 describes a recommendation device that acquires a current status of a user and recommends (distributes) content according to the current status of the user.

CITATION LIST

Patent Literature

[Patent Literature 1] Japanese Unexamined Patent Publication No. 2010-262369

SUMMARY OF INVENTION

Technical Problem

Here, a recommendation device described in Patent Literature 1 distributes content according to a status each time the status occurs. It is possible to increase the number of distributions by distributing the content each time the status occurs, but there is a problem that useless distributions (distributions troublesome for a user) increase and a click rate decreases. On the other hand, there is a problem that the target number of distributions is not achieved, for example, when distribution is performed only in a predetermined status in which a click probability is known to be high in order to improve the click rate. Thus, in the related art, it is difficult to achieve both improvement of the click rate and an increase in the number of distributions.

One aspect of the present invention has been made in view of the above circumstances, and an object of the present invention is to achieve both improvement of the click rate and an increase in the number of distributions.

Solution to Problem

A recommendation device according to an aspect of the present invention includes a number-of-distributions derivation unit configured to derive an expected value of the number of distributions of content in each status in each time period according to a probability of occurrence of a status of a user in each time period; a score derivation unit configured to derive a probability score of the content for each time period and for each status according to likelihood of clicking the content in each status in each time period; a recommendation information determination unit configured to extract a combination of a time period, status, and content in which the probability score is equal to or higher than a predetermined threshold value, and determine the content relevant to the combination as recommendation information; and a distribution unit configured to distribute the recommendation information on the basis of information indicated by the combination extracted by the recommendation information determination unit, wherein the recommendation information determination unit adjusts a value of the threshold value so that a sum of the expected values according to the time period and the status included in the extracted combination or a plurality of combinations reaches a predetermined target number of distributions.

In the recommendation device according to an aspect of the present invention, the expected value of the number of distributions of content is derived according to the probability of occurrence of each status in each time period. Further, the probability score of the content is derived according to the ease of clicking the content in each status in each time period. In the present recommendation device, a combination of a time period, a status, and content in which the probability score is equal to or higher than a predetermined threshold value is extracted, and the content relevant to the combination is used as the recommendation information. Thus, only content of a combination having a probability score equal to or higher than the threshold value is set as the recommendation information, so that a click rate of content to be recommended can be guaranteed. Further, in the present recommendation device, since the threshold value is adjusted so that the sum of the expected values relevant to the combinations extracted as those exceeding the threshold value reaches the predetermined target number of distributions, it is possible to guarantee the number of pieces of content to be distributed. As described above, with the recommendation device according to an aspect of the present invention, it is possible to achieve both improvement of the click rate and an increase in the number of distributions.

Advantageous Effects of Invention

According to an aspect of the present invention, it is possible to achieve both improvement of the click rate and an increase in the number of distributions.

BRIEF DESCRIPTION OF DRAWINGS

FIG. 2 is a diagram illustrating various tables relevant to processing.

DESCRIPTION OF EMBODIMENTS

Hereinafter, embodiments of the present invention will be described in detail with reference to the accompanying drawings. In the description of the drawings, the same or equivalent elements are denoted by the same reference signs, and repeated description is omitted.

Figure 1:
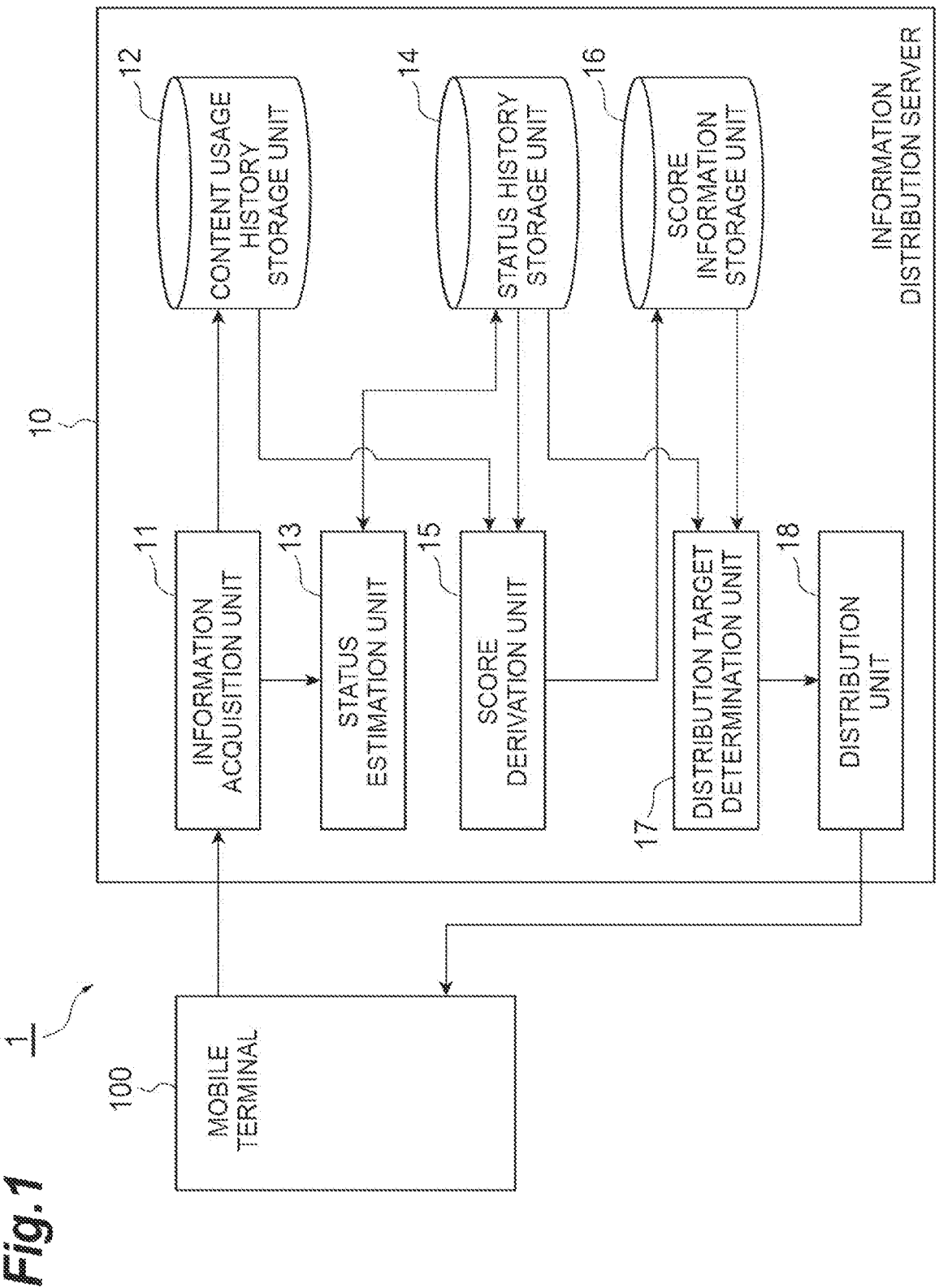
FIG. 1 is a diagram illustrating a functional configuration of an information distribution server according to the present embodiment.

FIG. 1 is a diagram illustrating a functional configuration of an information distribution server 10 according to the present embodiment. The information distribution server 10 is a recommendation device that estimates preferences of the user on the basis of a browsing history of the user (a click history of content), and recommends content according to the preferences of each user to the user (that is, distributes content to the mobile terminal 100 of the user). The information distribution server 10 recommends content according to the status of the user in consideration of the browsing history for each status of the user. The status of the user is, for example, information including at least one of a location, behavior, and movement state of the user. In the present embodiment, it is assumed that the status of the user is the location of the user. Information relevant to the location of the user is acquired from, for example, position information of the mobile terminal 100 of the user. More specifically, the information distribution server 10 determines content to be recommended to the user so that the sum of the expected values reaches a predetermined target number of distributions and content that is likely to be clicked according to the status of the user becomes a distribution target, in consideration of the expected value of the number of distributions of content derived from the probability of occurrence of the status of the user (this will be described in detail below).

As illustrated in FIG. 1, the recommendation system 1 includes an information distribution server 10 and a mobile terminal 100. The mobile terminal 100 is a communication terminal having a communication function, and is, for example, a smartphone, a tablet terminal, or a PC. The mobile terminal 100 is configured to be able to communicate with the information distribution server 10. The mobile terminal 100 has at least a function of transmitting the usage history of content to the mobile terminal 100, a function of transmitting measured position information, a function of receiving the distribution of the recommended target content from the information distribution server 10, and a function of displaying the content. The usage history of content includes, for example, information for identifying content and information indicating a date and time when content has been used. The mobile terminal 100 periodically transmits the position information to the information distribution server 10 at predetermined time intervals, for example. Although only one mobile terminal 100 is illustrated in FIG. 1, the recommendation system 1 actually includes a plurality of mobile terminals for each user.

As illustrated in FIG. 1, the information distribution server 10 includes an information acquisition unit 11, a content usage history storage unit 12, a status estimation unit 13 (a number-of-distributions derivation unit), a status history storage unit 14, a score derivation unit 15, a score information storage unit 16, a distribution target determination unit 17 (a recommendation information determination unit), and a distribution unit 18.

The information acquisition unit 11 has a function of acquiring (receiving) information from the mobile terminal 100. The information acquisition unit 11 acquires the usage history of the content executed in the mobile terminal 100 from the mobile terminal 100. The information acquisition unit 11 may acquire the usage history of the content each time execution occurs in the mobile terminal 100, or may collectively acquire the usage history of the content at predetermined time intervals. The information acquisition unit 11 stores the acquired usage history of the content in the content usage history storage unit 12. Further, the information acquisition unit 11 acquires the position information of the mobile terminal 100 from the mobile terminal 100. The information acquisition unit 11 periodically acquires, for example, the position information of the mobile terminal 100 at predetermined time intervals. The position information acquired by the information acquisition unit 11 may include position information of a plurality of time periods measured in the mobile terminal 100. The information acquisition unit 11 inputs the acquired position information of the mobile terminal 100 to the status estimation unit 13.

The content usage history storage unit 12 stores the usage history of the content stored by the information acquisition unit 11. The usage history of the content is information including, for example, a user ID for identifying the user of the mobile terminal 100 that has executed the content, a time period in which the content has been executed, a genre of the executed content, and a content ID for identifying the executed content. The genre of the content is information indicating a category of the content and, for example, when the content is a video, the genre is information such as a drama, a variety program, or a movie.

The status estimation unit 13 estimates the status of the user (the user of the mobile terminal 100) relevant to the position information on the basis of the position information of the mobile terminal 100 input by the information acquisition unit 11. The status estimation unit 13, for example, estimates that the status of the user is a state in which the matching user is present at a location of the user when the acquired position information matches (or approximates to) position information of a preset specific location of the user for each user. The preset specific location of the user is, for example, a place at which the user is regularly present, such as a home, a company, or a school. Further, the status estimation unit 13 may estimate that the status of the user is a state in which the user is present elsewhere (other than at the specific location of the user) when the acquired position information is not the preset specific location of the user. The status estimation unit 13 stores the estimated the status of the user in the status history storage unit 14.

Further, the status estimation unit 13 derives the expected value of the number of distributions of the content in each status in each time period according to the probability of occurrence of the status of the user in each time period. That is, the status estimation unit 13 refers to the status history storage unit 14 to derive the probability of occurrence of each status in the same time period for each user. The status estimation unit 13 regards a likelihood that the content will be able to be distributed as being higher in a status in which the probability of occurrence is higher, and increases the expected value of the number of distributions. The status estimation unit 13 stores the expected value of the content distribution for each status in each time period derived for each user in the status history storage unit 14.

The status history storage unit 14 stores the status of the user stored by the status estimation unit 13. Specifically, the status history storage unit 14 stores, for example, information in which a user ID, a status of the user (the location of the user), and a time period are associated with each other. Further, the status history storage unit 14 stores the expected value of the content distribution for each status in each time period stored by the status estimation unit 13. Specifically, the status history storage unit 14 stores a status occurrence probability table in which the user ID, the status of the user (the location of the user), the time period, and the expected value of content distribution according to the probability of occurrence, as illustrated in FIG. 2(c), are associated with each other.

The score derivation unit 15 derives the probability score of the content for each time period and for each status according to the ease of clicking the content in each status in each time period. Such a probability score may be derived for each user, may be derived for each of users having similar attributes, or may be derived in common for all users. Further, the probability score of the content may be a probability score of each content or may be a probability score of each genre of the content. In the following description, it is assumed that the probability score is derived for each genre for each user. The score derivation unit 15 first acquires a usage history of content (the number of times of use for each content) of the user of which the probability score is derived, from the content usage history storage unit 12. The score derivation unit 15 acquires the status of the user (the number of occurrences of each status) corresponding to an execution time period (date and time) of each content indicated in the usage history of the content from the status history storage unit 14. Further, the score derivation unit 15 acquires a distribution history of the content (information indicating when certain content has been distributed) distributed to the mobile terminal 100 of the user by the distribution unit 18. Accordingly, the score derivation unit 15 can derive a click rate of each genre for each time period and for each status for the user for which the probability score is derived. The score derivation unit 15 derives a probability score of the genre for each time period and for each status according to the click rate. A higher probability score indicates that it is more likely for the genre to be clicked. When the score derivation unit 15 derives the probability score for each genre, the score derivation unit 15 may reduce a weight in deriving the score for the content in which the number of occurrences of the status is small. The score derivation unit 15 stores information including the derived probability score in the score information storage unit 16.

The score information storage unit 16 stores information including the probability score derived by the score derivation unit 15. Specifically, the score information storage unit 16 stores a recommendation table in which the user ID, the status of the user, the time period, the genre, and the probability score illustrated in FIG. 2(*b*) are associated with each other.

The distribution target determination unit 17 extracts a combination of the time period, the status, and the content (specifically, a genre relevant to the content) in which the probability score is equal to or higher than a predetermined threshold value, and determines the content of the genre relevant to the combination as a distribution target (recommendation information). The distribution target determination unit 17 adjusts the threshold value so that a sum of the expected values of content distribution (see FIG. 2(*c*)) according to the time period and the status included in the extracted combination or a plurality of combinations reaches a predetermined target number of distributions. Specifically, the distribution target determination unit 17 executes first processing for setting a predetermined initial value as the threshold value, second processing for determining whether or not the sum of expected values has reached the target number of distributions, and third processing for gradually decreasing the threshold value until it is determined in the second processing that the sum has reached the target number of distributions.

Here, it is assumed that 80% is set as an initial value of the threshold value as illustrated in FIG. 2(*a*). FIG. 2(*a*) illustrates a request table that gives the initial value. In the request table, as illustrated in FIG. 2(*a*), a genre of content that is a distribution target may be designated. Further, it is assumed that the score information storage unit 16 stores the recommendation table illustrated in FIG. 2(*b*), and the status history storage unit 14 stores the status occurrence probability table illustrated in FIG. 2(*c*). Further, it is assumed that the target number of distributions is set to 0.8. In this case, the distribution target determination unit 17 first refers to the recommendation table illustrated in FIG. 2(*b*), and extracts a combination of "status: elsewhere, time period: 12:00, genre: drama, and probability score: 80%" as a combination in which the probability score is equal to or larger than the initial value (80%) given in the request table (see FIG. 2(*b*)). The distribution target determination unit 17 refers to the status occurrence probability table illustrated in FIG. 2(*c*), and extracts the expected value (0.3) of content distribution according to the status and the time period of the extracted combination (that is, status: outside, and time period: 12:00). Now, since the sum (0.3) of the expected values is smaller than the target number of distributions (0.8), the distribution target determination unit 17 decreases the threshold value which is the initial value. The distribution target determination unit 17 decreases the threshold value by a predetermined value (for example, 10%).

The distribution target determination unit 17 newly extracts a combination of "status: company, time period: 9:00, genre: drama, and probability score: 70%" as a combination in which the probability score is equal to or larger than the reset threshold value (70%) (see FIG. 2(*b*)). The distribution target determination unit 17 refers to the status occurrence probability table illustrated in FIG. 2(*c*) to extract the expected value (0.1) of content distribution according to the status and the time period (that is, status: company, and time period: 9:00) of the newly extracted combination. Now, since the sum (0.3+0.1=0.4) of the expected values is smaller than the target number of distributions (0.8), the distribution target determination unit 17 decreases the threshold value by a predetermined value (for example, 10%) so that the threshold value is 60%. The distribution target determination unit 17 newly extracts a combination of "status: home, time period: 18:00, genre: drama, and probability score: 60%" as a combination in which the probability score is equal to or larger than the reset threshold value (60%) (see FIG. 2(*b*)). The distribution target determination unit 17 refers to the status occurrence probability table illustrated in FIG. 2(*c*) to extract the expected value (0.4) of content distribution according to the status and the time period (that is, status: home, and time period: 18:00) of the newly extracted combination. Now, since the sum (0.3+0.1+0.4=0.8) of the expected values has reached the target number of distributions (0.8), the distribution target determination unit 17 ends the adjustment of the threshold value and determines the content relevant to each combination extracted so far as the distribution target. The distribution target determination unit 17 outputs information indicated by the extracted combination to the distribution unit 18.

Further, the distribution target determination unit 17 adjusts (increases) the threshold value when the sum of the expected values greatly exceeds the target number of distributions. That is, the distribution target determination unit 17 executes fourth processing for determining whether or not the sum is equal to or smaller than the predetermined upper limit number of distributions, and fifth processing for gradually increasing the threshold value until it is determined in the fourth processing that the sum is equal to or smaller than the predetermined upper limit number of distributions. For example, it is assumed that the target number of distributions is set to 0.4 and the upper limit number of distributions is set to 0.7. Now, when the threshold value is 60% and the recommendation table illustrated in FIG. 2(*b*) is referred to, the distribution target determination unit 17 extracts all three combinations illustrated in FIG. 2(*b*). In this case, the distribution target determination unit 17 refers to the status occurrence probability table illustrated in FIG. 2(*c*), and extracts an expected value of content distribution (0.3+0.1+0.4=0.8) according to the status and time period of the extracted combination. Now, since the sum (0.8) of the expected values is larger than the upper limit number of distributions, the distribution target determination unit 17 increases the threshold value by a predetermined value. For example, when the threshold value is 70%, the sum of the expected values becomes 0.4, which is equal to or smaller than the upper limit number of distributions, and a target distribution has been reached and thus, the distribution target determination unit 17 ends adjustment of the threshold value and determines the content extracted at the threshold value of 70% to be the distribution target. The distribution target determination unit 17 may adjust (increase) the threshold value when the sum of the expected values exceeds the target number of distributions. That is, the distribution target determination unit 17 may execute processing for regarding the target number of distributions as the upper limit number of distributions described above and determining whether or not the sum is equal to or smaller than the target number of distributions (corresponding to the fourth processing described above), and processing of gradually increasing the threshold value until it is determined that the sum is equal to or smaller than the target number of distributions (corresponding to the fifth processing described above).

Figure 3:
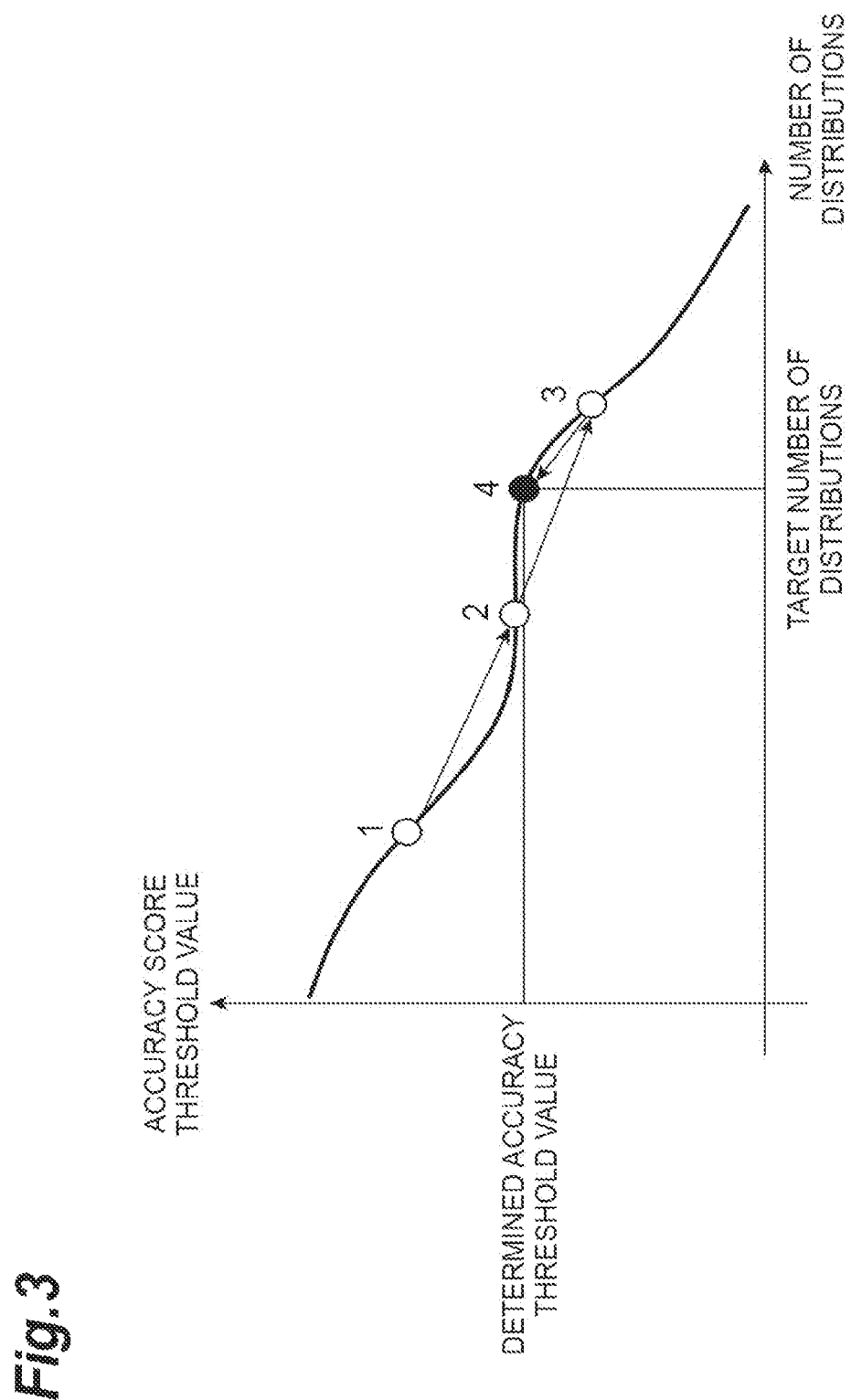
FIG. 3 is a diagram illustrating a threshold value setting of a probability score.

Thus, the distribution target determination unit 17 determines the distribution target so that the number of distributions does not become too large (does not exceed the upper limit number of distributions), in addition to reaching the target number of distributions. FIG. 3 is a diagram illustrating a setting of the threshold value of the probability score. In FIG. 3, a horizontal axis indicates the number of distributions and a vertical axis indicates the threshold value. In the setting of the threshold value of the probability score, for example, binary search is performed so that the threshold value is set so that the target number of distributions is reached and the number of distributions does not become too large. The example illustrated in FIG. 3 shows that the threshold value is gradually decreased so that the number of distributions reaches the target number of distributions, the number of distributions exceeds the target number of distributions and the upper limit number of distributions at a threshold value set at the third time, and the number of distributions reaches the target number of distributions and does not exceed the upper limit number of distributions at a threshold value set for the fourth time so that the threshold value is increased.

Figure 4:
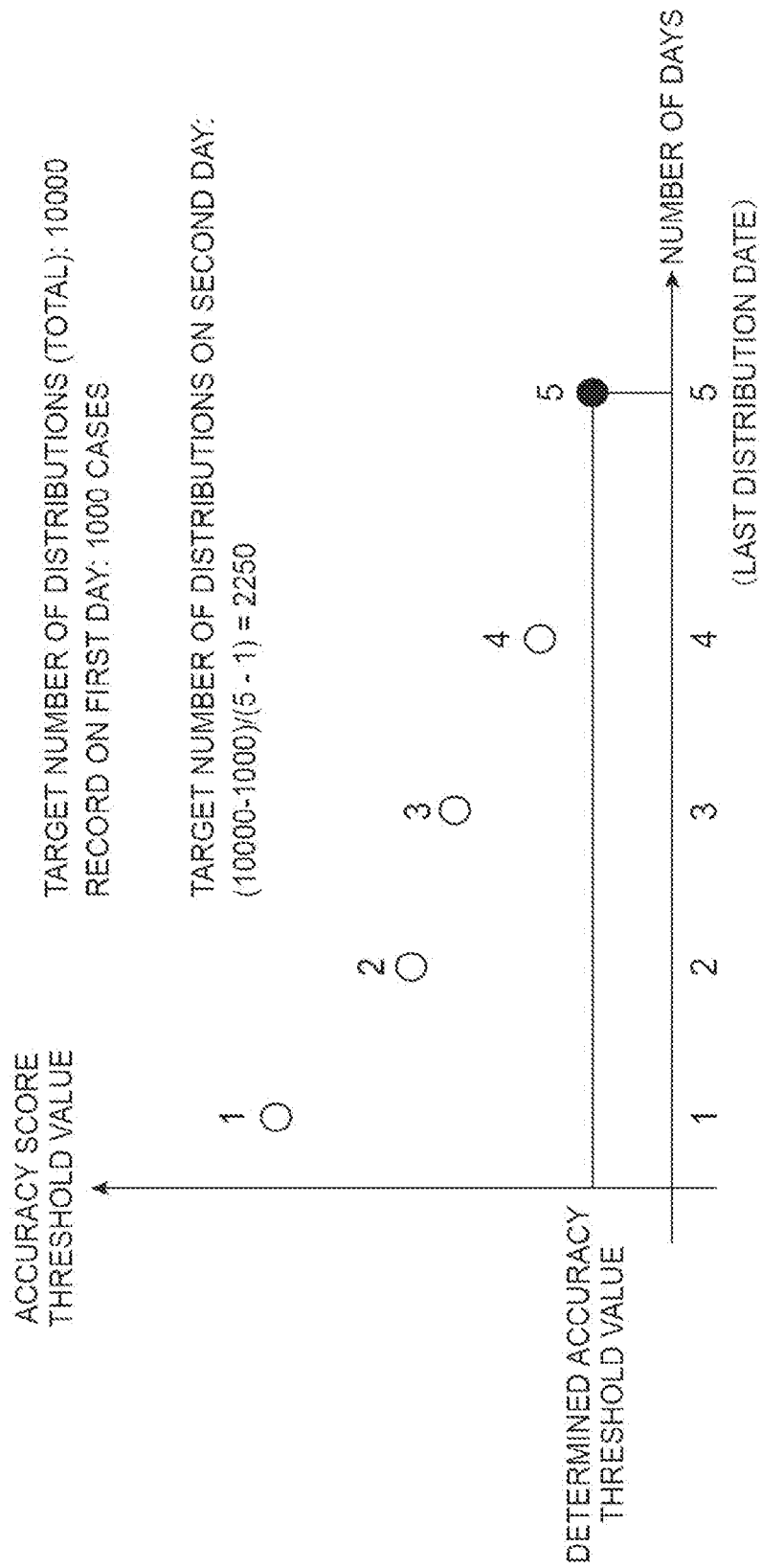
FIG. 4 is a diagram illustrating a setting of the threshold value of the probability score according to a distribution period.

Further, the distribution target determination unit 17 may change a threshold value to be set according to a time in a distribution period. An increase in the threshold value limits a distribution status to a status in which the click rate is high. Therefore, the distribution target determination unit 17 may increase the threshold value to emphasize the click rate rather than the number of distributions when the time in the entire distribution period is early (the number of days on which there has been distribution is small), and decrease the threshold value so that the target number of distributions can be achieved to emphasize the number of distributions rather than the click rate when the time approaches a last distribution date. The target number of distributions for each day is determined by the target number of distributions in the entire period/the number of remaining days in the distribution period. FIG. 4 is a diagram illustrating the setting of the threshold value of the probability score according to the distribution period. In FIG. 4, a horizontal axis indicates the number of days and a vertical axis indicates the threshold value. In the example illustrated in FIG. 4, for example, it is assumed that the target number of distributions is 10,000 and the number of days on which there has been distribution is five days in the entire distribution period. When a record of the number of distributions based on the threshold value set on the first day is assumed to be 1000, the target number of distributions on the second day is (10,000−1000)/(5−1)=2250. When a total target number of distributions is simply divided by the number of days, the target number of distributions per day is 2000 and thus, the target number of distributions of 2250 on the second day indicates that the number of distributions on the first day was small (smaller than the target number of distributions). In this case, the distribution target determination unit 17 sets the threshold value to be smaller than that on the first day since more distributions than on the first day are required. Thus, the threshold value is changed during the distribution period so that the target number of distributions can be achieved while recorded values are taken into account. At a stage in which the number of days on which there has been distribution is small (for example, a first day), it is preferable for threshold value adjustment to be strictly performed so that the number of distributions does not exceed the target number of distributions per day. Accordingly, it is possible to realize a high click rate by narrowing down the content that is distributed at a stage in which there is a sufficient period to achieve the total target number of distributions (a stage in which the number of days on which there has been distribution is small). Then, decreasing the threshold value to achieve the total target number of distributions at an end of the distribution period may be emphasized.

Further, the distribution target determination unit 17 may calculate a transition probability of a future status of the user and determine the distribution target in consideration of the status in which a possibility of transition in the future is high. For example, the distribution target determination unit 17 acquires the current status of the user by referring to the status history storage unit 14, and calculates the transition probability of the future status in which the user is likely to transition from the current status in consideration of the status history. The status history storage unit 14 may not simply extract a combination having a high probability score, but may determine the distribution target so that a combination relevant to the status in which the user is highly likely to transition is easily extracted in consideration of the current status.

The distribution unit 18 distributes the recommendation information on the basis of the information indicated by the combination extracted by the distribution target determination unit 17. That is, the distribution unit 18 distributes the content of the genre of each combination to the user of each combination extracted by the distribution target determination unit 17 in the time period and status of each combination. For example, the distribution unit 18 acquires a latest status of a distribution target user from the status history storage unit 14 in a time of the extracted combination, and distributes corresponding content to the mobile terminal 100 of the user when conditions of the time and the status are satisfied. The distribution unit 18 may estimate that the status is relevant to the combination and distribute the corresponding content without acquiring the status of the distribution target user, for example, in the time of the extracted combination.

Next, processing executed by the information distribution server 10 will be described with reference to a flowchart illustrated in FIG. 5.

Figure 5:
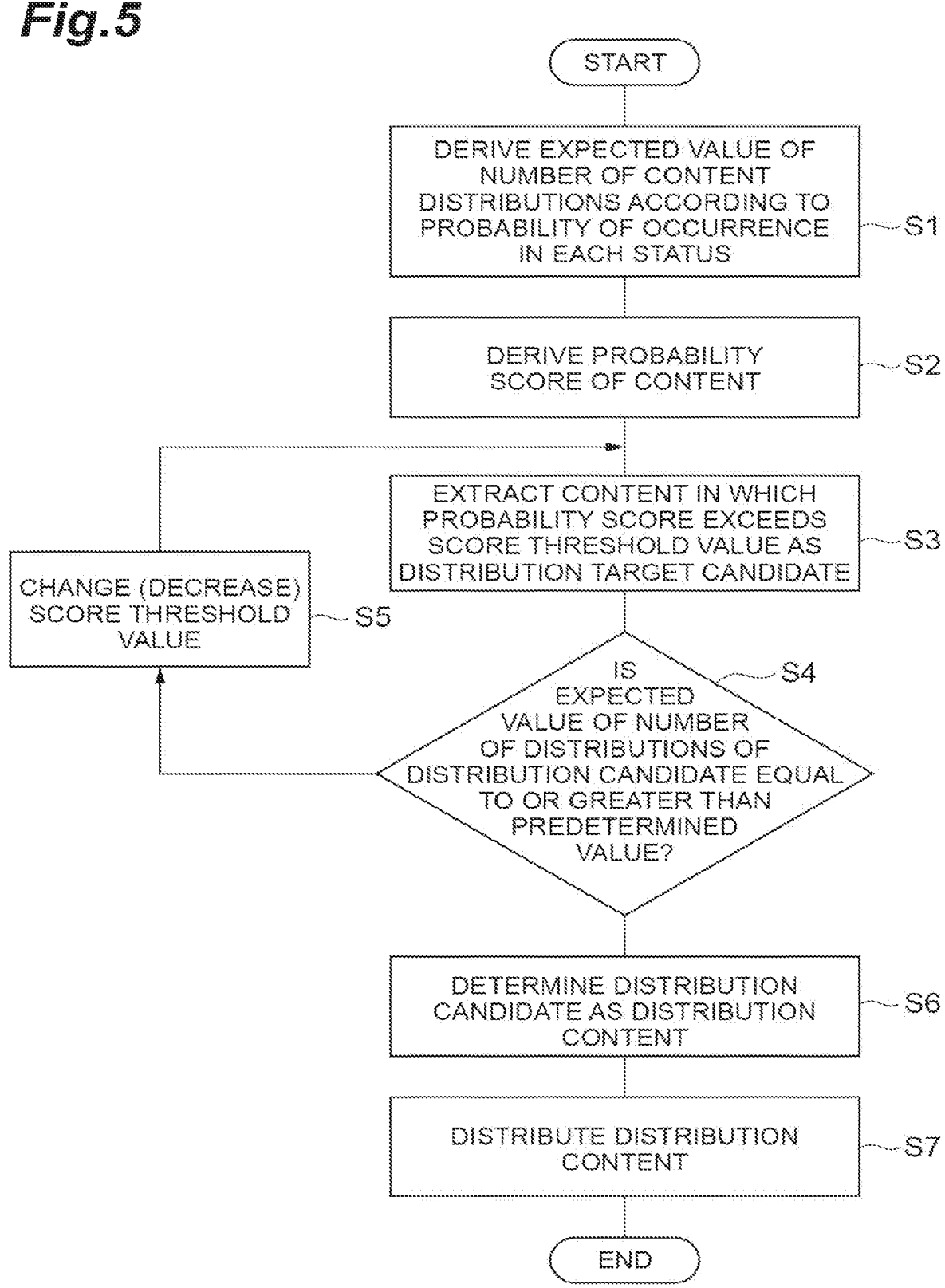
FIG. 5 is a flowchart illustrating processing that is executed by the information distribution server.

As illustrated in FIG. 5, in the information distribution server 10, the status estimation unit 13 derives the expected value of the number of distributions of the content in each status in each time period according to the probability of occurrence of the status of the user in each time period (step S1). That is, the status estimation unit 13 refers to the status history storage unit 14 to derive the probability of occurrence of each status in the same time period for each user. The status estimation unit 13 regards a possibility that the content can be distributed as being higher in a status in which the probability of occurrence is higher, and increases the expected value of the number of distributions.

Subsequently, the score derivation unit 15 derives the probability score of the content for each time period and for each status according to the ease of clicking the content in each status in each time period (step S2).

Subsequently, the distribution target determination unit 17 extracts the combination of the time period, the status, and the content (specifically, the genre relevant to the content) in which the probability score is equal to or higher than the predetermined threshold value, and sets the content of the genre relevant to the combination as a distribution target candidate (step S3).

Subsequently, the distribution target determination unit 17 determines whether or not the expected value of the number of distributions relevant to the above-described distribution candidate is equal to or greater than a predetermined value (the target number of distributions has been reached) (step S4). When it is determined in step S4 that the target number of distributions has not been reached, the distribution target determination unit 17 decreases the threshold value (step S5) and performs the processing of step S3 again. The processing of steps S5, S3, and S4 is repeated until it is determined in step S4 that the target number of distributions has been reached.

When it is determined in step S4 that the target number of distributions has been reached, the distribution target determination unit 17 determines each distribution target candidate as distribution content (step S6). The distribution unit 18 distributes the recommendation information on the basis of the information indicated by the combination extracted by the distribution target determination unit 17 (step S7). That is, the distribution unit 18 distributes the content of the genre of each combination to the user of each combination extracted by the distribution target determination unit 17 in the time period and status of each combination.

Next, an operation and effects of the information distribution server 10 according to the present embodiment will be described.

The information distribution server 10 according to the present embodiment includes a status estimation unit 13 that derives an expected value of the number of distributions of content in each status in each time period according to the probability of occurrence of the status of the user in each time period, a score derivation unit 15 that derives a probability score of the content for each time period and for each status according to ease of clicking the content in each status in each time period, a distribution target determination unit 17 that extracts a combination of a time period, status, and content in which the probability score is equal to or higher than a predetermined threshold value, and determines the content relevant to the combination as a distribution target, and a distribution unit 18 that distributes the distribution target on the basis of information indicated by the combination extracted by the distribution target determination unit 17, wherein the distribution target determination unit 17 adjusts a value of the threshold value so that a sum of the expected values according to the time period and the status included in the extracted combination or a plurality of combinations reaches a predetermined target number of distributions.

In the information distribution server 10 according to the present embodiment, the expected value of the number of distributions of content is derived according to the probability of occurrence of each status in each time period. Further, the probability score of the content is derived according to the ease of clicking the content in each status in each time period. The information distribution server 10 extracts a combination of a time period, a status, and a content in which the probability score is equal to or higher than a predetermined threshold value, and sets the content relevant to the combination as the distribution target. Thus, only content of a combination having a probability score equal to or higher than the threshold value is set as a distribution target, so that a click rate of a content to be recommended can be guaranteed. Further, in the information distribution server 10, since the threshold value is adjusted so that the sum of the expected values relevant to the combinations extracted as those exceeding the threshold value reaches the predetermined target number of distributions, it is possible to guarantee the number of pieces of content to be distributed. As described above, according to the information distribution server 10, it is possible to achieve both improvement of the click rate and an increase in the number of distributions. As described above, since only content of a combination having a probability score equal to or higher than the threshold value is set as a distribution target so that a processing amount can be curbed, a technical effect of reduction of a processing load in a processing unit such as a CPU is also achieved.

In the information distribution server 10 described above, the distribution target determination unit 17 executes the first processing for setting a predetermined initial value as the threshold value, the second processing for determining whether or not the sum has reached the target number of distributions, and the third processing for gradually decreasing the threshold value until it is determined in the second processing that the sum has reached the target number of distributions. According to such a configuration, it is possible to gradually decrease a condition relevant to the click rate (the threshold value) so that a condition of the target number of distributions is cleared, while, for example, setting the initial value of the threshold value to be large and increasing a condition relevant to the click rate of content that is a distribution target. It is possible to curb a large decrease in the click rate of the content in order to achieve the target number of distributions by gradually decreasing the threshold value, and more reliably achieve both an improvement in the click rate and an increase in the number of distributions.

In the information distribution server 10 described above, the distribution target determination unit 17 executes fourth processing for determining whether or not the sum is equal to or smaller than the predetermined upper limit number of distributions, and fifth processing for gradually increasing the threshold value until it is determined in the fourth processing that the sum is equal to or smaller than the predetermined upper limit number of distributions. According to such a configuration, when the number of distributions becomes unnecessarily larger, it is possible to adjust the number of distributions so that only content having a higher click rate is distributed, and curb useless distribution (distribution without clicking).

The status of the user described above includes at least one of a location, behavior, and mobile state of the user. Accordingly, it is possible to distribute content more suitable for the status.

Figure 6:
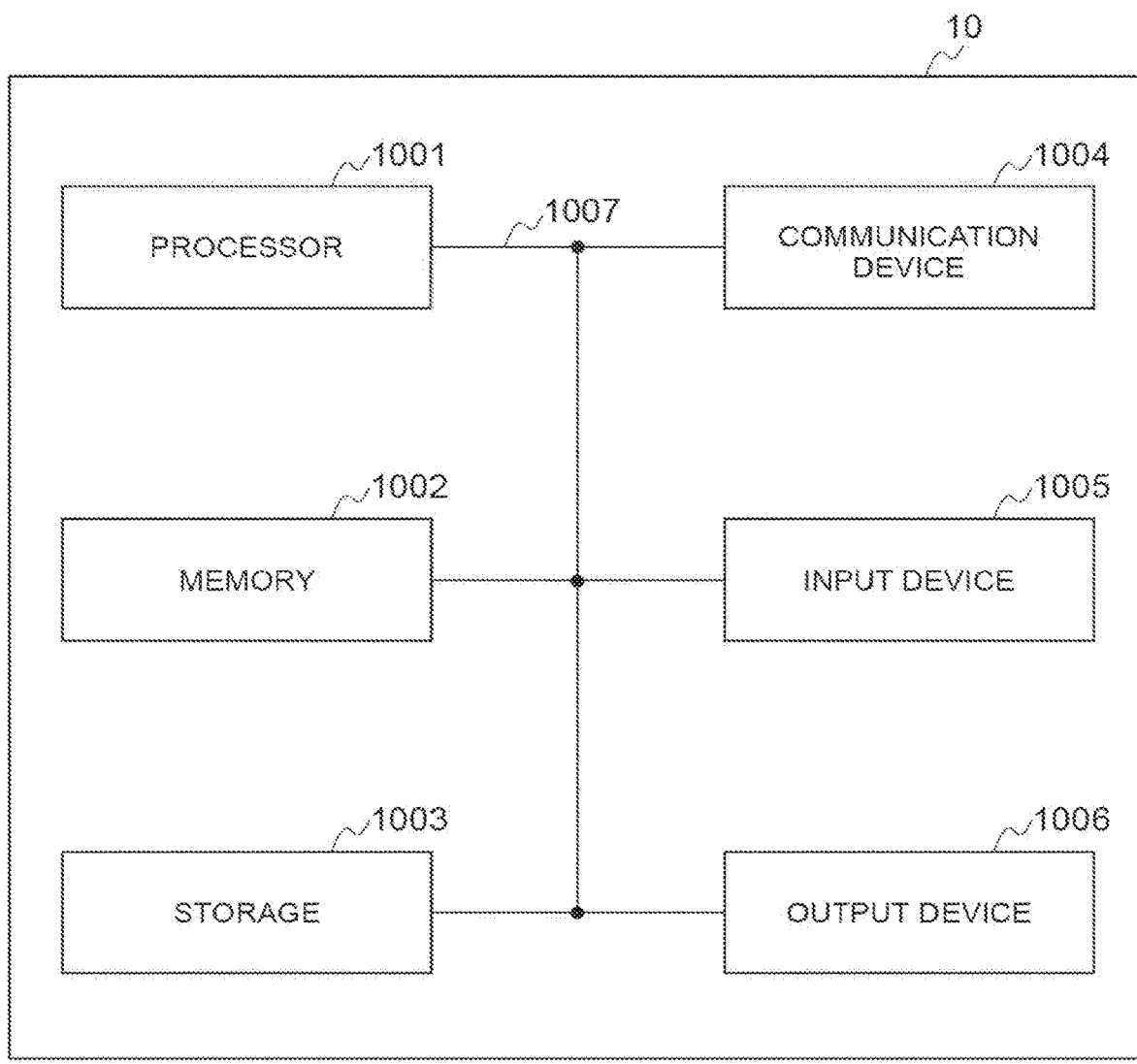
FIG. 6 is a diagram illustrating a hardware configuration of the information distribution server.

Finally, a hardware configuration of the information distribution server 10 will be described with reference to FIG. 6. The information distribution server 10 described above may be physically configured as a computer device including a processor 1001, a memory 1002, a storage 1003, a communication device 1004, an input device 1005, an output device 1006, a bus 1007, and the like.

In the following description, the term "device" can be read as a circuit, a device, a unit, or the like. The hardware configuration of the information distribution server 10 may be configured to include one or a plurality of illustrated devices or may be configured without including some of the devices.

Each function in the information distribution server 10 is realized by loading predetermined software (program) into hardware such as the processor 1001 or the memory 1002 so that the processor 1001 performs calculation to control communication that is performed by the communication device 1004 or reading and/or writing of data in the memory 1002 and the storage 1003.

The processor 1001, for example, operates an operating system to control the entire computer. The processor 1001 may be configured as a central processing unit (CPU) including an interface with a peripheral device, a control device, a calculation device, a register, and the like. For example, a control function of the distribution target determination unit 17 or the like of the information distribution server 10 may be realized by the processor 1001.

Further, the processor 1001 reads a program (program code), a software module, or data from the storage 1003 and/or the communication device 1004 into the memory 1002 and executes various processing according to the program, the software module, or the data. As the program, a program for causing the computer to execute at least some of the operations described in the above embodiment may be used. For example, the control function of the distribution target determination unit 17 or the like of the information distribution server 10 may be realized by a control program stored in the memory 1002 and operating in the processor 1001, and other functional blocks may be similarly realized. Although the case in which the various processing described above are executed by one processor 1001 has been described, the processing may be executed simultaneously or sequentially by two or more processors 1001. The processor 1001 may be implemented by one or more chips. The program may be transmitted from a network via an electric communication line.

The memory 1002 is a computer-readable recording medium and may be configured of, for example, at least one of a read only memory (ROM), an erasable programmable ROM (EPROM), an electrically erasable programmable ROM (EEPROM), and a random access memory (RANI). The memory 1002 may be referred to as a register, a cache, a main memory (a main storage device), or the like. The memory 1002 can store an executable program (program code), software modules, and the like in order to implement a wireless communication method according to the embodiment of the present disclosure.

The storage 1003 is a computer-readable recording medium and may be configured of, for example, at least one of an optical disc such as a compact disc ROM (CD-ROM), a hard disk drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above may be, for example, a database including the memory 1002 and/or the storage 1003, a server, or another appropriate medium.

The communication device 1004 is hardware (a transmission and reception device) for performing communication between computers via a wired network and a wireless network and is also referred to as a network device, a network controller, a network card, or a communication module, for example.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. The input device 1005 and the output device 1006 may have an integrated configuration (for example, a touch panel).

Further, each device such as the processor 1001 and the memory 1002 is connected by the bus 1007 for communicating information. The bus 1007 may be configured by using a single bus, or may be configured by using a different bus for each device.

Further, the information distribution server 10 may include hardware such as a microprocessor, a digital signal processor (DSP), an application specific integrated circuit (ASIC), a programmable logic device (PLD), and a field programmable gate array (FPGA), and some or all of respective functional blocks may be realized by the hardware. For example, the processor 1001 may be implemented using at least one of these pieces of hardware.

Although the present invention has been described in detail above, it is apparent to those skilled in the art that the present embodiment is not limited to the embodiment described in the present specification. The present embodiment can be implemented as a modified and changed aspect without departing from the spirit and scope of the present invention defined by the description of the claims. Accordingly, the description of the present specification is intended for the purpose of illustration and does not have any restrictive meaning with respect to the embodiment.

Each aspect or embodiment described in the present disclosure may be applied to long term evolution (LTE), LTE-Advanced (LTE-A), SUPER 3G, IMT-Advanced, 4G, 5G, future radio access (FRA), W-CDMA (registered trademark), GSM (registered trademark), CDMA2000, ultra mobile broad-band (UMB), IEEE 802.11 (Wi-Fi), IEEE 802.16 (WiMAX), IEEE 802.20, Ultra-Wide Band (UWB), Bluetooth (registered trademark), another system using an appropriate system, and/or a next generation system extended on the basis of these.

A process procedure, a flowchart, and the like in each aspect/embodiment described in the present disclosure may be in a different order unless inconsistency arises. For example, for the method described in the present disclosure, elements of various steps are presented in an exemplary order, and the elements are not limited to the presented specific order.

Input or output information or the like may be stored in a specific place (for example, a memory) or may be managed in a management table. Information or the like to be input or output can be overwritten, updated, or additionally written. Output information or the like may be deleted. Input information or the like may be transmitted to another device.

A determination may be performed using a value (0 or 1) represented by one bit, may be performed using a Boolean value (true or false), or may be performed through a numerical value comparison (for example, comparison with a predetermined value).

Each aspect/embodiment described in the present disclosure may be used alone, may be used in combination, or may be used by being switched according to the execution. Further, a notification of predetermined information (for example, a notification of "being X") is not limited to being made explicitly, and may be made implicitly (for example, a notification of the predetermined information is not made).

Software should be construed widely so that the software means an instruction, an instruction set, a code, a code segment, a program code, a program, a sub-program, a software module, an application, a software application, a software package, a routine, a sub-routine, an object, an executable file, a thread of execution, a procedure, a function, and the like regardless of whether the software may be called software, firmware, middleware, microcode, or hardware description language or called another name.

Further, software, instructions, and the like may be transmitted and received via a transmission medium. For example, when software is transmitted from a website, a server, or another remote source using a wired technology such as a coaxial cable, an optical fiber cable, a twisted pair, or a digital subscriber line (DSL) and/or a wireless technology such as infrared rays, radios, or microwaves, the wired technology and/or the wireless technology is included in the definition of the transmission medium.

The information, signals, and the like described in the present disclosure may be represented using any of various different technologies. For example, data, an instruction, a command, information, a signal, a bit, a symbol, a chip, and the like that can be referred to throughout the above description may be represented by a voltage, a current, an electromagnetic wave, a magnetic field or a magnetic particle, an optical field or a photon, or any combination of these.

The terms described in the present disclosure and/or terms necessary for understanding of the present disclosure may be replaced by terms having the same or similar meanings.

Further, information, parameters, and the like described in the present disclosure may be represented by an absolute value, may be represented by a relative value from a predetermined value, or may be represented by corresponding different information.

A user terminal may be called a mobile communication terminal, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms by those skilled in the art.

The term "determining" used in the present disclosure may include a variety of operations. The "determining" can include, for example, regarding calculating, computing, processing, deriving, investigating, searching (looking up) (for example, searching in a table, a database, or another data structure), or ascertaining as "determining". Further, "determining" can include regarding receiving (for example, receiving information), transmitting (for example, transmitting information), inputting, outputting, or accessing (for example, accessing data in a memory) as "determining". Further, "determining" can include regarding resolving, selecting, choosing, establishing, comparing or the like as "determining". That is, "determining" can include regarding a certain operation as "determining".

The description "based on" used in the present disclosure does not mean "based only on" unless otherwise noted. In other words, the description "based on" means both of "based only on" and "at least based on".

When the terms "first", "second", and the like are used in the present disclosure, any reference to elements thereof does not generally limit an amount or order of those elements. These terms can be used in the present disclosure as a convenient way to distinguish between two or more elements. Thus, the reference to the first and second elements does not mean that only two elements can be adopted or that the first element has to precede the second element in some way.

When "include", "including" and modifications thereof are used in the present disclosure or claims, those terms are intended to be comprehensive like the term "comprising". Further, the term "or" used in the present disclosure or claims is intended not to be an exclusive OR.

In the present specification, it is assumed that a plurality of devices are also included unless a single device is clearly indicated by the context or technically.

In the whole of the present disclosure, it is assumed that a plurality of ones are included as long as the context does not clearly indicate a single one.

REFERENCE SIGNS LIST

10 Information distribution server (recommendation device)
13 Status estimation unit (number-of-distributions derivation unit)
15 Score derivation unit
17 Distribution target determination unit (recommendation information determination unit)
18 Distribution unit.

The invention claimed is:

1. A recommendation device comprising:
a number-of-distributions derivation unit configured to derive an expected value of the number of distributions of content in each status in each time period according to a probability of occurrence of a status of a user in each time period;
a score derivation unit configured to derive a probability score of the content for each time period and for each status according to ease of clicking the content in each status in each time period;
a recommendation information determination unit configured to extract a combination of a time period, status, and content in which the probability score is equal to or higher than a predetermined threshold value, and determine the content relevant to the combination as recommendation information; and
a distribution unit configured to distribute the recommendation information on the basis of information indicated by the combination extracted by the recommendation information determination unit,
wherein the recommendation information determination unit adjusts a value of the threshold value so that a sum of the expected values according to the time period and the status included in the extracted combination or a plurality of combinations reaches a predetermined target number of distributions.

2. The recommendation device according to claim 1, wherein the recommendation information determination unit executes first processing for setting a predetermined initial value as the threshold value, second processing for determining whether or not the sum has reached the target number of distributions, and third processing for gradually decreasing the threshold value until it is determined in the second processing that the sum has reached the target number of distributions.

3. The recommendation device according to claim 1, wherein the recommendation information determination unit executes fourth processing for determining whether or not the sum is equal to or smaller than a predetermined upper limit number of distributions, and fifth processing for gradually increasing the threshold value until it is determined in the fourth processing that the sum is equal to or smaller than the upper limit number of distributions.

4. The recommendation device according to claim 1, wherein the status of the user includes at least one of a location, behavior, and moving state of the user.

* * * * *